June 3, 1952  C. M. GARNER  2,598,902
GAS VALVE
Filed June 19, 1946  5 Sheets-Sheet 1
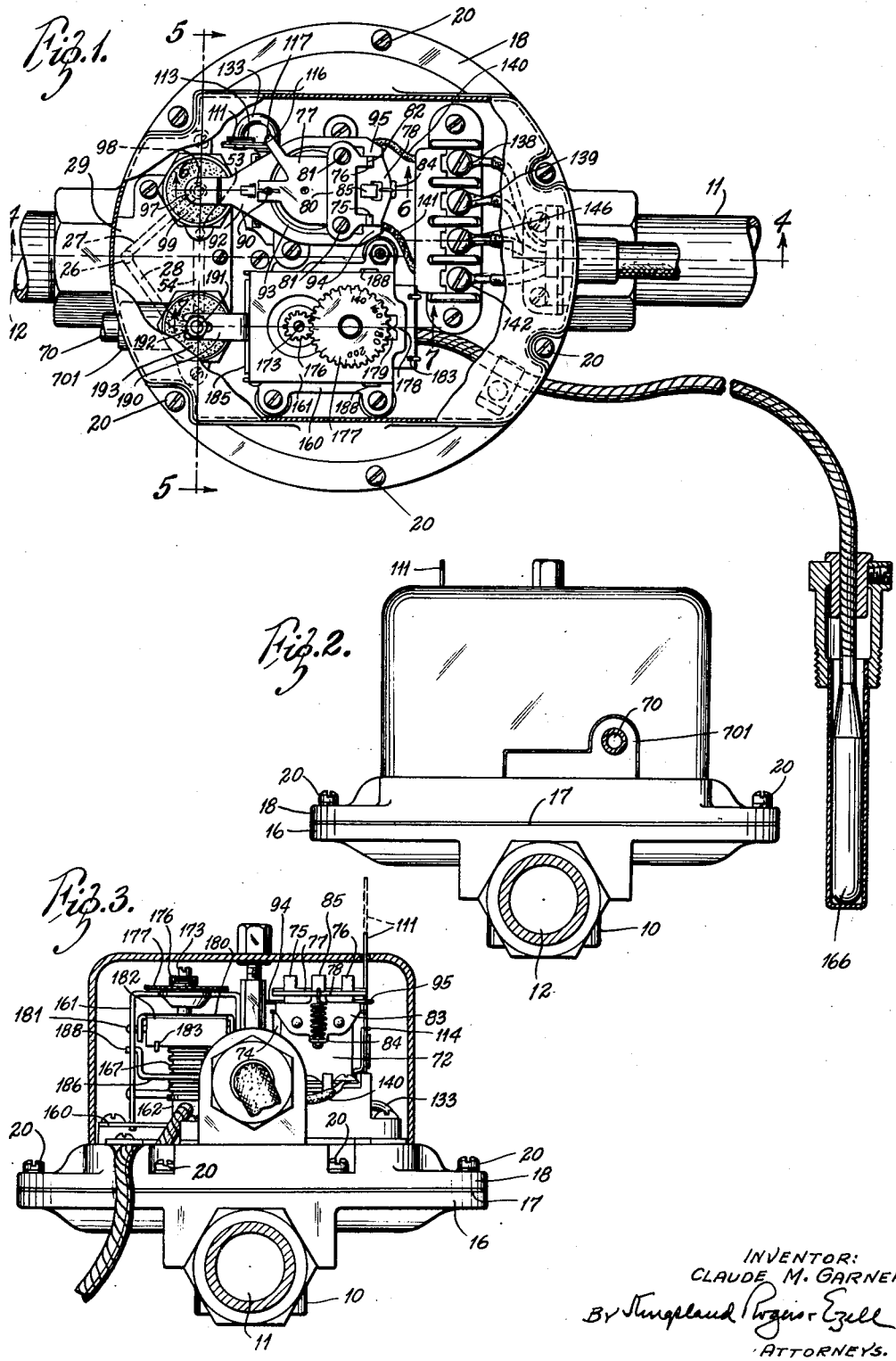
INVENTOR:
CLAUDE M. GARNER
By Kingsland Rogers Ezell
ATTORNEYS.

June 3, 1952

C. M. GARNER 2,598,902

GAS VALVE

Filed June 19, 1946

INVENTOR:
CLAUDE M. GARNER,
By Stevens Rogers Egee
ATTORNEYS.

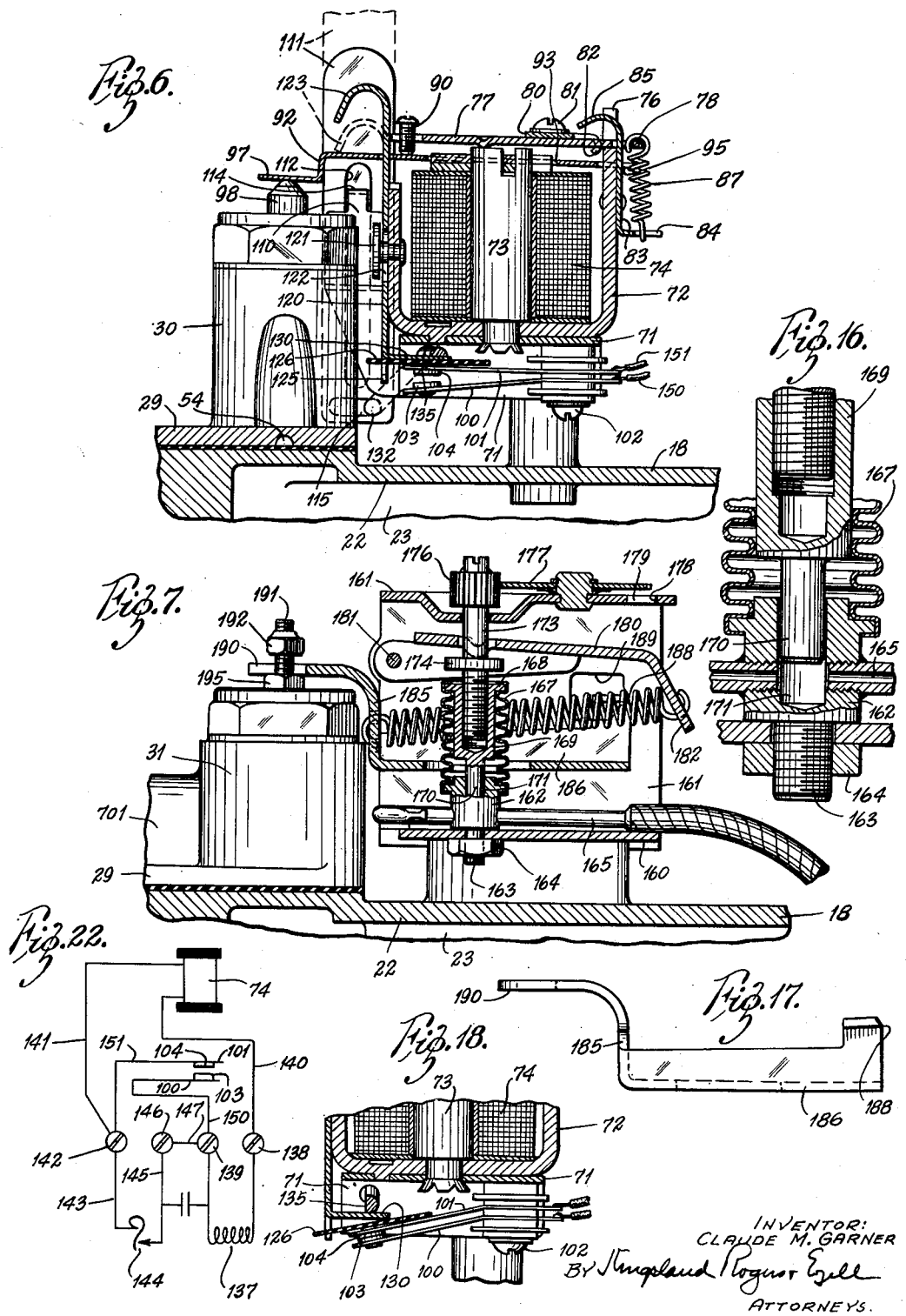

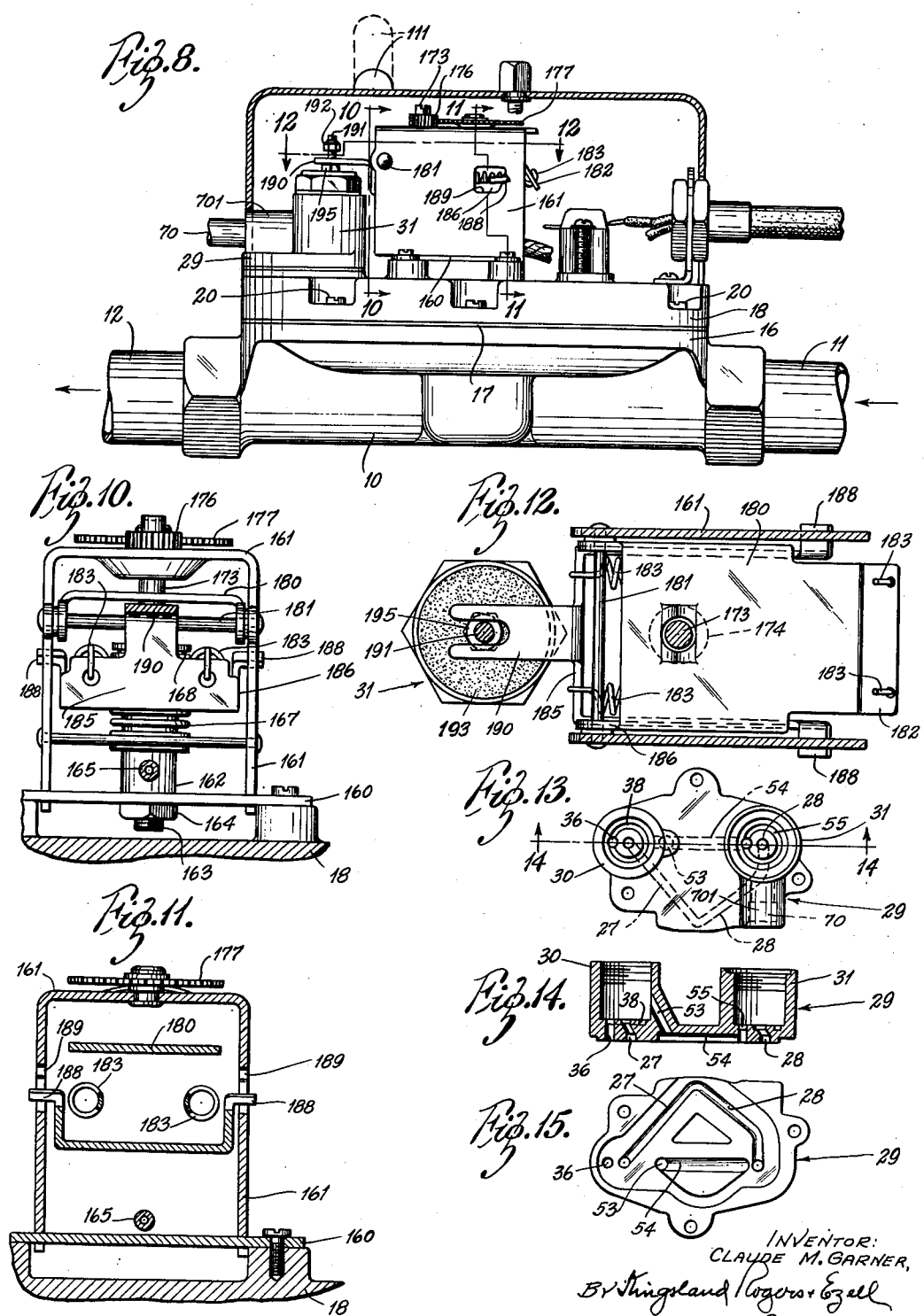

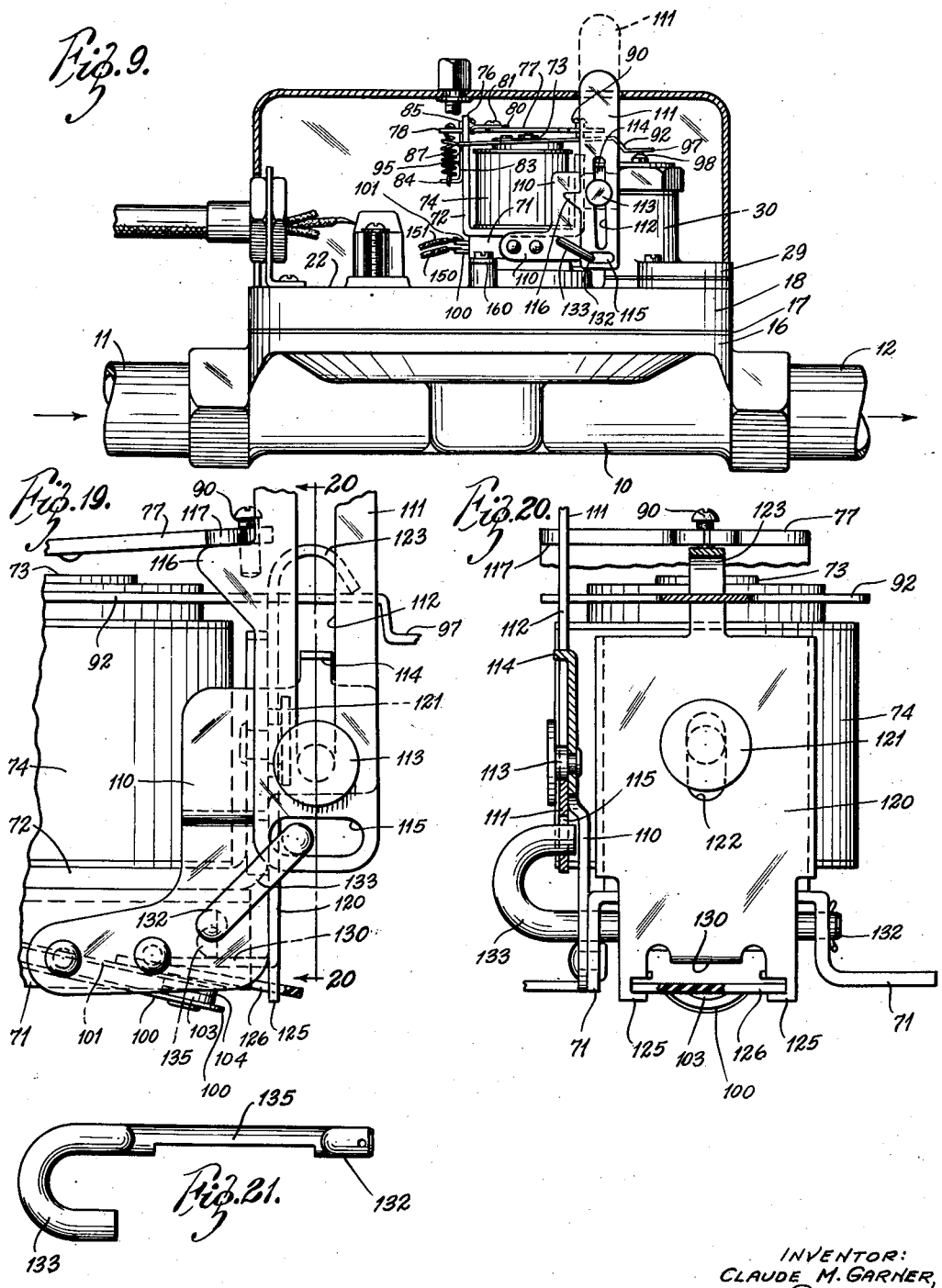

Patented June 3, 1952

2,598,902

UNITED STATES PATENT OFFICE 2,598,902

GAS VALVE

Claude M. Garner, Clayton, Mo., assignor, by mesne assignments, to Missouri Automatic Control Corporation, a corporation of Missouri Application June 19, 1946, Serial No. 677,830

10 Claims. (Cl. 236—80)

The present invention relates to a gas valve. More particularly, it relates to a valve of the diaphragm type, wherein the diaphragm is controlled by certain control devices that respond to the peculiar changes in physical conditions that are critical.

Broadly, it is an object of the invention to provide a gas valve of this type that is caused to respond to changes in space temperatures, with a limit switch override thereon, the space temperature control device and the limit switch device each comprising a single valve device of simple construction and operation. More particularly, it is an object to provide a valve, as above set forth, wherein there is a diaphragm chamber and gas passages controlling the gas flow to and from said chamber, together with a first valve operable into either of two positions, wherein it controls whether said passage shall be connected to a source of gas supply or to exhaust, together with a second limit switch valve, also to control said passage and to determine whether it be connected to a source of gas supply or exhaust, regardless of the determination by the first valve.

A further object of the invention is to provide a valve, as in the foregoing paragraph, wherein each of the control devices operates with an instantaneous or snap action between two opposed valve seats.

A further object of the invention is to provide a novel manual means to cause the gas valve to open, even in the absence of power. A further object is to provide a manual means, as aforesaid, which automatically returns the valve to its automatic control as soon as power is restored.

A further object is to provide a valve of the diaphragm type and to provide controls therefor which are relatively simple in construction, easy to fabricate and durable.

Other objects will appear in the description to follow.

In the drawings:

Fig. 1 is a plan view of the valve with the cover partly broken away and in section;

Fig. 2 is an end elevation, taken from the left end of Fig. 1;

Fig. 3 is an end elevation, taken from the right end of Fig. 1, with the hood or cover shown in section;

Fig. 6 is a longitudinal vertical section, taken on the line 6—6 in the upper left middle of Fig. 1;

Fig. 7 is a section, taken on the line 7—7 in the lower left middle of Fig. 1;

Fig. 8 is a side elevation of the valve with the cover shown in diametrical section;

Fig. 9 is a side elevation of the valve, taken from the side opposite that of Fig. 8 and with the casing shown in diametrical section;

Fig. 10 is a section on the line 10—10 of Fig. 8, showing the left hand end of the limit switch mechanism;

Fig. 11 is a vertical section on the line 11—11 of Fig. 8, showing additional parts of the limit switch mechanism;

Fig. 12 is a horizontal section on the line 12—12 of Fig. 8, showing part of the limit switch mechanism;

Fig. 13 is a top view of a valve housing casting;

Fig. 14 is a vertical section on the line 14—14 of Fig. 13;

Fig. 15 is a bottom view of the casting of Fig. 13;

Fig. 16 is an enlarged diametrical section through the connection into the bellows for the limit switch mechanism;

Fig. 17 is a side elevation of an operating lever of the limit switch mechanism;

Fig. 18 is a view of the room thermostat shunting switch in closed position, this switch being shown in open position in Fig. 6;

Fig. 19 is an enlarged view of the manual operating mechanism shown in Fig. 9;

Fig. 20 is an end view of this part of Fig. 9, taken from the right end thereof;

Fig. 21 is a view of an operating crank in this mechanism; and

Fig. 22 is a wiring diagram of the mechanism.

Figure 4:
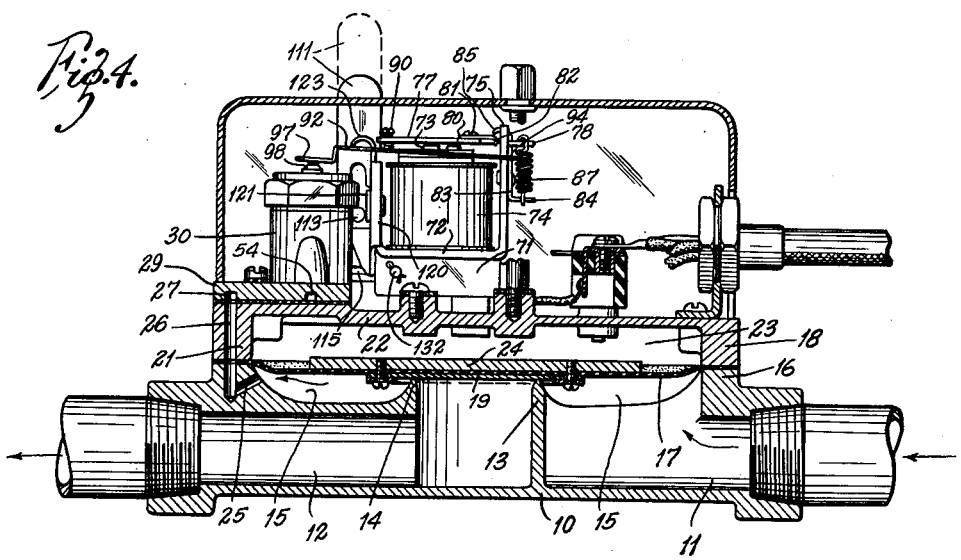
Fig. 4 is a lengthwise vertical section, taken on the line 4—4 of Fig. 1.

The valve includes a main lower body portion 10 having an inlet 11 and an outlet 12, the outlet opening into a vertically disposed circular wall 13 that provides a circular valve seat 14 at its upper end. This valve seat constitutes a port of communication from the inlet 11 to the outlet 12. The inlet opens into a lower diaphragm chamber 15 formed as an extension of the casting 10 at its upper surface and being circular.

The diaphragm chamber is bordered by a rim 16 of the lower body portion 10, this rim being circular and receiving on its upper surface a diaphragm 17. The diaphragm is clamped by having a circular cap member 18 superposed over the diaphragm margin resting upon the rim 16. The cap is screwed to the lower casting 10 by suitable screws 20. It will be observed that this cap is formed with a depending flange 21 and a platform 22 that afford an upper diaphragm chamber 23. The diaphragm 17 has centrally disposed valve and weighting elements 19 and 24, respectively, secured to it, the valve element 19 cooperating with the valve seat 14.

The operation of the diaphragm follows one of the conventional arrangements in that, when the pressure from the inlet side that acts below the diaphragm is also admitted to the diaphragm chamber 23 above the diaphragm, the valve 19 will be closed by the action of gravity, but, when inlet line pressure in the upper diaphragm chamber 23 is exhausted to atmosphere, then the somewhat higher line pressure, acting on the lower side of the diaphragm, will raise the same and open the valve 19.

The control for the valve 19 is here two-fold. The lower valve housing 10 has a passage 25 therein that communicates with a passage 26 in the cap 18. This passage 26, in turn, registers with two branch passages 27 and 28 in a valve housing casting 29 that is attached to the upper surface of the platform 22. This casting 29 (see Figs. 13-15) has two upstanding cylindrical portions 30 and 31 forming valve housings, into the bottom of which the passages 27 and 28 open, respectively.

Referring first to the valve housing 30 (Fig. 5), within this housing is a lower valve seat member 33 having a lower circular flange with a threaded upstanding boss 34 rising from the central portion thereof. A circular group of ports 35 through the flange of the member 34 are provided and arranged to register with a port 36 leading through the bottom of the cylindrical member 30, which port, in turn, is adapted to register with a port 37 that extends through the cap member 18 into the diaphragm chamber 23 above the diaphragm. The port 36 in the member 29 opens into an annular groove 38, so that there will be a distribution of gas flow between all of the openings 35 and the passage 36. Immediately above the ports 35, the boss 34 has a groove 39 into which the ports 35 communicate.

There is a central opening 40 through the boss 34 which registers with the upstanding part of the passage 27. It thus receives line pressure gas. A suitably perforated pliable washer is interposed between the flange of the member 33 and the bottom of the cylindrical housing 30. The opening 40 has a ball valve seat 41 formed at its upper end, with which a ball valve 42 may register. A coil spring 44 urges the ball valve upwardly away from its seat.

The valve housing 30 also receives an upper valve seat member 47, which valve seat member has an internally threaded cavity 46 in its lower end which receives the threaded boss 34 of the lower valve seat member 33. There is a vertical groove 48 extending up one side of the boss 34, so that there is always full communication between the upper part of the cavity 46 and the upper diaphragm chamber 23. The upper valve seat member 47 has a bore 49 that is coaxial with the cavity 46. This bore 49 provides an upper valve seat 50 for the ball valve 42 opposite the valve seat 41. There is a transverse opening 51 leading from the bore 49 to a peripheral groove 52 on the valve seat member 47. This groove 52 registers with a port 53 leading downwardly at an angle into communication with a groove 54 in the lower surface of the casting 29, which groove cooperates with the top of the cap member 18 to form a passageway. This passageway leads into the interior of the other cylindrical valve housing 31. To this end, it registers with a circular groove 55 in the bottom wall of the cavity of the cylindrical housing 31.

There is a lower valve seat member 56 in the cylindrical member 31 that is similar to the valve seat member 33 in the cylindrical member 30. It has an upstanding central portion 57 and a flanged bottom. The flanged bottom portion engages against a suitably ported sealing washer, and has a plurality of openings 58 arranged circularly about its center and adapted to register with the groove 55 to permit gas flow from the groove to the top part of the valve member 56. The valve member also has a groove 59 to permit the gas to flow from its bottom to the top.

The valve member has a central opening 60 with a valve seat 61 at the top thereof, this valve seat being adapted to receive a ball valve 62. The upstanding portion 57 of this member has a peripheral groove 63 at its base to insure fluid flow from the groove 55 to the cut-away notch 59.

The valve seat member 56 is supported within an upper valve seat member 64 that is threaded into the cylindrical member and has a threaded cavity 65, into which the valve member fits. This cavity has an upper valve seat 66 with which the ball valve 62 may register. Above the valve seat 66, there is a bore 67, from which a passage 68 extends to a peripheral groove 69 around the outside of the plug 63. This groove 69 is adapted to register with an outlet opening 70 formed in a lateral extension 701 of the cylindrical member 31. This opening 70 may receive a pipe fitting to conduct the gas to any suitable place.

The two operating means for the pilot valves 42 and 62 will now be described.

The valve 42 is operated by a magnetic coil that is adapted to be connected for operation when a room thermostat or the like closes. This part of the mechanism includes a bracket 71. This bracket or base is in the general shape of an inverted U, with horizontally projecting ears that are screwed to upstanding bosses on the member 18.

The bracket 71 receives on its upper surface a U-shaped coil support 72. A center post 73 is permanently fixed to the support 72, and, about this post, there is provided a magnetic coil 74.

The inner vertical arm of the bracket 72 has two upstanding ears 75 and 76 over which is fitted a rocking armature 77. The armature has a tongue portion 78 that projects outwardly through the two upstanding ears or prongs 75 and 76. This tongue extends laterally, as shown in Fig. 1, to the back sides of the two prongs 75 and 76. Thus, the armature is restricted against movement to the leftward in Figs. 1 and 6. It is restricted against movement to the right by the presence of a plate 80 that is held by screws 81 to its top. This plate is provided with two downturned hooks 82 that are located adjacent the left hand faces of the two prongs 75 and 76. They, therefore, prevent the armature plate 77 from slipping to the right in Figs. 1 and 6.

The same inner upstanding arm of the bracket 72 receives a fitting 83 that has an outstanding end 84 at its lower part and an overhanging hook-like portion 85 at its top. This hook-like portion passes through an opening in the armature 77 and, by overlying the armature, limits the upward displacement of the right end thereof, as shown in Fig. 6.

A coil spring 87 is stretched between the projecting end 78 of the armature member and the lower projection 84 on the piece 83. It, therefore, urges the armature member 77 to pivot in a clockwise direction, as appears in Fig. 6, the rocking taking place about the edge of the upstanding arm of the bracket 72 between the two prongs 75 and 76.

When the coil 74 is energized, it is adapted to attract the armature 77 and rock its outer end downwardly, stretching the spring 87. The outer or forward end of the armature carries an adjustable abutment screw 90, for a purpose to appear.

An actuating blade 92, preferably of spring-like material, is formed from a plate with a large opening 93 therein. This plate has backwardly projecting ears 94 and 95 that are set back to rest on the projecting portions of the plate 83 that extend, as shown in Fig. 3, laterally beyond the limits of the upstanding arm of the bracket 72.

The arm 92 has a forward extension 97 thereon that is preferably offset downwardly, as shown. This arm engages on a push rod 98 that extends down through the plug 47, so as to impinge upon the ball valve 42. A suitable diaphragm 99 is provided to seal off the top of the cylindrical member 30, and yet to permit reciprocable operation of the push rod 98.

Below the bracket 71, a switch mechanism is fastened. This switch consists of two spring blades 100 and 101 that are secured to the bottom of the supporting bracket 71 by suitable screws 102, with the interposition of the necessary insulation. As shown in full lines in Fig. 6, the two switch blades 100 and 101 normally rest with their contacts 103 and 104, respectively, disengaged.

This switch is part of a manual operating mechanism which is designed to depress the ball valve 42 and to close the switch contacts at the same time. This manual mechanism includes an upstanding support standard 110 that is riveted to the outer vertical side of the inverted U-shaped support 71. The standard 110 slidably supports a manual operating strip 111, which strip has a vertical slot 112 therein that receives a rivet 113, which rivet is fixed into the standard 110. The standard likewise has a projecting nib 114 that fits within the slot so as to prevent rotation of the manual strip 111 and to confine it to vertical movements.

In addition to the slot 112, the strip 111 has a slot 115 at its bottom that extends transversely thereof. On its side edge, the strip 111 has a projecting shoulder 116 that is disposed so as to come under an arm 117 that projects at an angle from the rocking armature 77.

On the outer leg of the coil supporting bracket 72, there is a flanged plate 120. The flanges confine this plate to vertical movement, and it is further confined by a headed rivet 121 secured to the coil support 72 and operating in a vertical slot 122 in the flanged plate 120.

This plate, at its upper end, has a curved neck portion 123 that passes upwardly through an opening in the actuating blade 92 and is hooked over the top thereof.

The lower end of the plate 120 has two depending prongs 125. These prongs receive a notched piece of insulation 126 that overlies the upper switch blade 101. The notches and their engagement with the prongs 125 prevent this strip of insulating material from slipping out of position. It is further confined by an inwardly turned prong 130 that overlies it. This prong 130 extends above the switch blades and between the vertical sides of the bracket 71. It also underlies a semi-circular crank 132. This crank is supported in the side walls of the supporting bracket 71 and passes through one of the side walls, to provide a curved crank arm 133. Between the two side walls of the bracket 71, the crank 132 has an offset semi-circular portion 135. When the crank is turned, this offset portion may move from its position in Fig. 6 to its position in Fig. 18. In Fig. 6, it will be seen that it presents its flat part to the inwardly turned tongue 130, but, when it is turned to slightly beyond 90°, it depresses the prong 130 and closes the two switch contacts.

This crank is actuated by the engagement of its semi-circular arm 133 in the slot 115 of the manually operating strip 111.

It will be seen that, when the manually operating strip is pulled upwardly, it turns the crank arm slightly over 90°. In so doing, it closes the switch contacts and also causes the tongue 130 of the plate 120 to move downwardly. This latter movement causes the hooked upper part 123 on the plate 120 to engage the operating plate 92 and bring the same downwardly to seat the valve 42 on its lower seat.

Fig. 22 shows the manner of electrically connecting this part of the mechanism. In Fig. 22, a source of power is shown in the form of a secondary winding 137, it being connected to two terminals 138 and 139. A wire 140 connects the terminal 138 with the coil 74. A wire 141 connects the other end of the coil 74 with a terminal 142. This terminal is connected by a wire 143 to the room thermostat, generally indicated at 144. The other side of the room thermostat is connected by a line 145 with a terminal 146, that is connected by a line 147 with the terminal 139.

The switch contacts 103 and 104 are connected across the terminals 139 and 142. The switch contact 103 is connected by a line 150 with the terminal 139, and the switch contact 103 is connected by a line 151 with the terminal 142.

The limit switch mechanism is supported upon the cap 18 beside the coil 74. To this end, there is a supporting plate 160 attached to the top of the cap 18. A frame 161 in the form of an inverted U is mounted over the top of the plate 160.

The plate 160 supports a tubular head 162 which has a threaded end 163 adapted to pass through the plate 160 and to be secured thereto by a nut 164. This head 162 receives the end of a tube 165 that is connected to a bulb 166. This bulb 166 will be located at a point that reflects critical temperatures.

The head 162 receives one end of a bellows 167. The other end of this bellows is connected to a head 168 of a reciprocatable member 169, this member having a depending guide pin 170 at its lower end, which is adapted to fit loosely in a bore 171 in the head 162, thereby to restrain lateral movement or buckling of the non-rigid bellows. The bellows 167 is in communication with the tube 165, via that annular space between the loose fitting element 170 and the wall of the bore 171, so that it will receive the expanding fluid from the bulb.

The reciprocatable or expansible member 169, at its upper end, receives a threaded actuating stud 173, having a flange 174 thereon. It will be seen that the stud 173 is threaded into the member 169 and has a kerf at its outer end, so that the position of the flange 174, relative to the upper end of the bellows 167, may be varied. Means for indicating the relative positions of the upper end of the bellows 167 and the flange 174 is provided, and comprises a gear 176 rigidly attached to the upper end of the stud 173 and a larger meshing gear 177 pivoted on the top of the inverted U-bracket 161. The upper surface of the gear 177 is graduated (Fig. 1), and these graduations register with a pointer 178 formed in the edge of an opening 179 stamped into the top of the U-shaped bracket 161.

The flange 174, on the actuating member 173, is adapted to be engaged by depressed portions on a primary lever 180 mounted for rocking on a spindle 181 fastened in the supporting bracket 161. The primary lever 180 has a depending rearward extension 182 that receives one end of each of a pair of coil springs 183, that constitute toggle springs. The other end of each of these coil springs is attached to a vertical portion 185 of a secondary lever 186.

This secondary lever 186 constitutes a valve actuating lever. It is of the shape shown in Fig. 17, its back portion being generally channel-shaped with outstanding knife-edged bearings 188 at its inner end. These knife-edged bearings are adapted to fit into relatively large openings 189 in the two side portions of the bracket 161. These openings 189 have angular crotches into which the knife-edged bearings 188 fit for rocking movement. It will be seen that the coil springs 183 urge the knife-edged bearings into engagement with the crotches.

The forward end of the valve actuating lever 186 has the vertical portion 185 thereon, as already mentioned. From this portion 185, an actuating end 190 projects. This end 190 has a forked outer end which straddles the threaded upper end of a valve rod or stem 191. This rod passes down through a suitable opening in the valve seat member 64, and has the valve 62 integral with the bottom thereof. The valve rod 191 receives a nut 192 above the forked end 190 of the secondary lever 186, which nut is adjustable thereon. The rod 191 passes through a flexible diaphragm 193, that is sealed across the recessed top of the valve seat member 64. The rod 191 is clamped to the diaphragm by a suitable removable washer and nut arrangement 195.

The actuating mechanism for the valve 62 thus includes the bellows 167, the stud 173 and its flange 174, the primary lever 180, the secondary lever 186, the nuts 192 and 195, and the stem or rod 191, together with the springs 183. This constitutes an over-center snap-action mechanism, with the modification that the springs 183 exert a constant clockwise force upon the primary lever 180, as well as reversing forces on the secondary lever 186. The temperatures of raising and lowering the valve 62 are adjustable. The operation will be set forth hereafter.

*Operation*

The normal operation of this valve consists of a cycling under the influence of the room thermostat.

Assume, at the start, that the room thermostat is satisfied, which means that the main diaphragm valve 19 should be closed against the seat 14. This will come about when the gas pressure conditions above and below the diaphragm 17 are substantially equal, so that gravity can cause the diaphragm to close. In view of the fact that inlet gas pressure from the gas line is present in the lower diaphragm chamber, exerting an opening influence on the diaphragm, there must also be a gas pressure above the diaphragm in the upper diaphragm chamber 23, in order to counteract that below the diaphragm.

The inlet gas line pressure can pass from the lower diaphragm chamber through the passages 25 and 26 to the port passages 27 and 28 that lead to the valves 42 and 62, respectively. At the start, the valve 42 will be in its upper position against the seat 50. The valve 62 will be in its lower position against the seat 61. As a consequence, the gas line pressure through the passage 28 will enter the lower chamber 59 and will there be checked because of the closed valve 62. However, the gas from the passage 27 will flow upwardly into the chamber 40 and thence will flow around the valve 42. It is prevented from going to the upper chamber 49 by the valve, but can flow into the chamber 46, and thence, by the cut-away passage 48, downwardly to the groove 39, the circular series of openings 35 and into the circular groove 38, whence it may pass through the passages 36 and 37 to the upper side of the diaphragm, thus equalizing the pressures on both sides of the diaphragm and permitting the valve 19 to close.

It will be seen that the failure of line pressure for one reason or another will not affect this situation because the pressure is the same when the valves 42 and 62 are in the position shown, regardless of what the line pressure is.

If the room thermostat 144 closes, it brings power to the coil 74, as is evident from Fig. 22, the circuit being completed from the coil 137 through the terminal 138, the line 140, the coil 74, the line 141, the terminal 142, the line 143, the thermostat 144, the line 145, the terminal 146, the line 147, and the terminal 139 back to the secondary coil 137. When the coil 74 is thus energized, it draws down the rocking armature 77 until the same engages the top of the post 73. This downward movement of the armature 77 causes the screw 90 to engage the spring actuating blade 92, forcing the same down. It rocks by the engagement of its inner end in the notches on the sides of the upstanding end of the bracket 72, so that its outer end 97 depresses the pin 98 and displaces the ball valve 42 from the seat 50 to its lower seat 41. This action is opposed by the coil spring 44 of the valve. Also, the rocking of the armature 77 downwardly causes extension of the coil spring 87, which tends to return the armature when the magnetic force is relieved.

When the ball valve 42 moves downwardly, it closes off the input of line gas from the passage 27 to the chamber 46, which chamber is in direct and open communication with the upper diaphragm chamber 23. Thus, the line pressure can no longer reach the upper diaphragm chamber. Also, this upper diaphragm chamber is then connected to exhaust. The valve chamber 46, now closed to line pressure, is open to the passage 49 which communicates through the passages 51, 52, 53 and 54 to the other cylindrical member. At this other cylindrical member, the passage 54 registers with the annular groove 55 which is in communication with the circular series of passages 58 that lead into the upper valve chamber 65 through the notch 59. This valve chamber 65 is open past the valve seat 66, and the passage 67 to the passage 68, which is in communication with the peripheral groove 69 that registers with the exhaust outlet 70. This means that what gas was in the upper diaphragm chamber 23 passes therefrom to the upper side of the valve 42, thence around to the upper side of the valve 62 and out to exhaust, relieving the pressure in the upper diaphragm chamber to atmosphere. However, the lower diaphragm chamber is still subjected to line pressure so that the diaphragm is caused to lift and to admit gas past the main valve seat 14 to the outlet 12.

Figure 5:
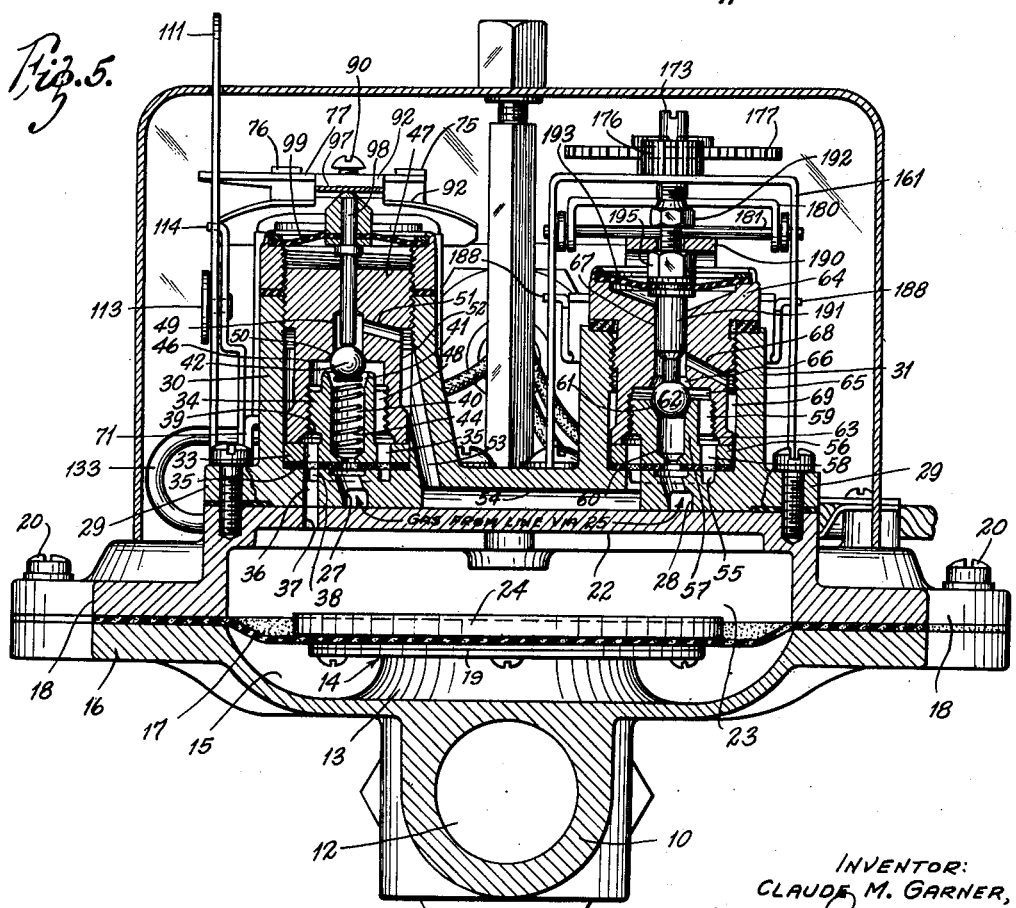
Fig. 5 is a vertical transverse section, taken on the line 5—5 on the left end of Fig. 1.

This condition would normally continue until the room thermostat is satisfied, reopening and relieving the magnetic coil 84, so that ultimately the valve 42 returns to the position shown in Fig. 5.

It may happen, however, that the temperature at the chosen critical point, such as in the furnace bonnet, exceeds the value for which the limit mechanism is set. Thereupon, the limit valve will be shifted, and the main valve closed regardless of the room thermostat and the valve 42.

The limit valve 62, during normal operation, when the temperatures at the bulb 166 are below the critical value, will be in its lower position. Under such circumstances, the bellows 167 will be contracted, and the stud 173 and its flange 174 will be in a downward position. The force of the springs 183 is constantly eccentric and clockwise (Fig. 7) on the primary lever 180, so that it rocks against the flange 174. Its right end (Fig. 7) and its axis of force upon the secondary lever 186 will be below the knife edges 188, so that its force acts counterclockwise upon the secondary lever 186, and holds the end 190 thereof downward against the nut 195, that, in turn, holds the valve 62 down against its lower seat 61.

When expansion of the bellows 167 elevates the flange 174, the primary lever 180 rocks its outer end 182 upward, and displaces the right end of the force axis of the springs 183. The force on the secondary lever will remain counterclockwise until the force axis of the springs is moved across to above the knife edges 188, whereupon the secondary lever will rapidly move clockwise, its speed increasing with degree of upward movement of its left end (Fig. 7). It will cause its end 190 to engage the nut 192, to shift the valve 62 to the seat 66, with a snap action. Thereafter, overtravel of the primary lever 180 causes no further movement of the secondary lever, but merely moves the right end of the springs upwardly. The maximum of such movement is always less than enough to remove all counterclockwise leverage of the springs upon the primary lever.

As will appear, shifting of the limit valve 62 will cause closing of the main valve, and hence cooling of the furnace. When the bulb 166 cools, the bellows 167 will contract, lowering the stud 173 and its flange 174. The constant clockwise force (Fig. 7) of the springs 183 upon the primary lever 180 will cause it to follow the flange 174 by rocking clockwise. After any overtravel is absorbed, the downward movement of the right end of the primary lever will begin its over-center function. The left end of the springs 183, at the portion 185 of the secondary lever, will be positioned by the nut 192. When the descent of the right end of these springs crosses their force line over to below the knife edges 188, the secondary lever will quickly rock counterclockwise, its end 190 shifting to the nut 195, and causing the valve 62 to be returned to its seat 61 with accelerating speed.

The temperature value at which the valve 62 is elevated is a function of the adjustment of the stud 173, since the lower position of the nut 195 on the valve stem is fixed. The position of elevating the valve is constant so far as the relative positions of the primary lever, the secondary lever, and the springs are concerned.

The temperature at which the valve 62 is lowered is a function of the adjustment of the upper valve stem nut 192. When the valve is raised, the nut 192 fixes the left end of the force line of the springs 183, which is that point adjustably fixed by the selected positioning of the nut 192. Hence, to move the force line across the knife edges 188, the right end of the primary lever 180 must move the right end of the springs 183 more or less, as is determined by the aforesaid selection of the position of the nut 192. The more the movement of the primary lever, the greater the differential between the temperature at which the limit mechanism causes closing of the main valve 19, and the temperature at which it permits reopening thereof.

The limit mechanism may ordinarily be expected to operate when the room thermostat is closed demanding heat. As a result, the valve 62 is ordinarily lifted when the valve 42 is in its lower position. It will be remembered that, when the valve 42 is in its lower position, the line pressure is cut off from the upper diaphragm chamber 23, and that chamber is open to atmosphere. However, when the valve 62 is elevated, this situation is changed. The previous exhaust line went from the passages 37, 36, 35, 48, the valve chamber 46, thence over the top of the valve 42, the passage 49, the passages 51, 52, 53, 54 to the other valve, by way of the passages 55, 58 and 59, and thence over the valve 62, which was in the position shown in Fig. 5, and ultimately to atmosphere. However, when the valve 62 is elevated, the exhaust passage is cut off at the valve seat 66, so that the upper diaphragm chamber 23 no longer can exhaust. Furthermore, the elevating of the valve 62 from the valve seat 61 admits gas from the passages 25, 26, 28 and 60, around the valve 62, back through the passages 59, 58, 55, 54, 53, 52, 51, 49, around the valve seat 50, because the valve 42 is depressed, and thence back into the upper diaphragm chamber 23. Thus, despite the fact that the room thermostat is demanding heat and the valve 42 is lowered, line pressure is admitted to the upper diaphragm chamber, the pressure conditions equalized above and below the diaphragm, and the main valve closes.

It will also be seen that the particular position of the valve 42 has no effect on the ability of the valve 62 to dominate, because, if the valve 42 should be released to its upper position, it would merely mean that the exhaust line would be cut off at two points and the line pressure admitted from two sources into the upper diaphragm chamber. This results because the exhaust passages always are under control of the valve 62, regardless of which position the valve 42 may assume.

The present mechanism provides means to open the valve manually in case of power failure, coupled with mechanism to return the valve automatically to control by power upon restoration thereof. Such operation is here attained by the manual blade 111, which may be lifted.

Lifting of the blade 111 rocks the curved end 133 of the crank 132, and the semi-cylindrical portion 135, and thereby depresses the tongue 130 of the end plate 120. The contact of the tongue 130 with the insulating sheet 126 and the contact of the latter with the switch blade 101 causes the upper switch blade to move downwardly to bring the contact 103 against the contact 102, as shown in Fig. 18, thus closing the switch. Likewise, the downward movement of the end plate 120 causes its upper hook 123 to engage the operating member 92 and to depress the same, drawing it away from the rocking armature 77, and causing the end 97 of the member 92 to depress the pin 98 to move the valve 42 from the valve seat 50 to the valve seat 41. When this movement of the blade 111 is completed, the crank arm 135 will have moved slightly beyond 90°, so that the upward force of the spring-like switch blades will merely tend to drive the crank arm further, rather than to reverse it. Such further movement is prohibited by the engagement of the crank parts. Hence, the parts will stay in the positions aforesaid, by this over-center lock arrangement.

As the strip 111 is moved to its upper position, its shoulder 116 rests immediately under the projection 117 on the armature 77 when the latter is in its upper released position to which it is drawn by the spring 83.

Under the foregoing conditions, the valve 42 will be in the same position it would occupy if power were on and the room thermostat were closed. The moment that power is restored, the coil 74 will be energized through the contacts 103 and 102, which shunt the room thermostat 144. The energization of the coil 74 will pull the armature 77 down, which will, by action against the shoulder 116 of the strip 111, depress the strip and cause it to return the crank arm over center, until the spring action of the blade cooperates with gravity and the downward pull of the armature 77 to complete the release of the manual means and the opening of the switch. Thereupon the further operation will return to control the room thermostat.

What is claimed is:

1. In a gas valve, a main housing having an inlet and an outlet, and a valve seat between them, a valve member cooperable with the valve seat, a diaphragm for operating the valve, said diaphragm extending across the housing to provide a first diaphragm chamber, a cap member adapted to fit over the housing and having edges to clamp the diaphragm to the housing, and providing a second diaphragm chamber, a valve housing member having two valve chambers therein, a valve in each valve chamber, a control passage from one diaphragm chamber to the first valve chamber, an exhaust passage and a pressure passage connected to said first valve chamber, the pressure passage being connected to the other diaphragm chamber the first valve being movable to connect its control passage with either the exhaust passage or with the pressure passage, yieldable means urging the first valve to connect the control passage with the pressure passage, the exhaust passage leading to the second valve chamber, and means to move the second valve to cut off said exhaust passage, there being no set sequence of operations for the two valves.

2. In a gas valve, a main housing having an inlet and an outlet, and a valve seat between them, a valve member cooperable with the valve seat, a diaphragm for operating the valve, said diaphragm extending across the housing to provide a first diaphragm chamber, a cap member adapted to fit over the housing and having edges to clamp the diaphragm to the housing, and providing a second diaphragm chamber, a valve housing member having two valve chambers therein, a valve in each valve chamber, a control passage from one diaphragm chamber to the first valve chamber, an exhaust passage and a pressure passage connected to said first valve chamber, the pressure passage of the first valve chamber being connected directly to the other diaphragm chamber, the first valve being movable to connect its control passage with either the exhaust passage or with the pressure passage, the exhaust passage leading to the second valve chamber, an exhaust passage and a pressure passage connecting into the second valve chamber, said pressure passage of the second valve chamber being connected directly to the other diaphragm chamber, the second valve being movable to cut off either of them, whereby to connect the exhaust passage of the first valve chamber either to the exhaust passage or to the pressure passage of the second valve chamber, and yieldable means urging the second valve to connect the exhaust passage from the first valve chamber with the exhaust passage of the second valve chamber.

3. In a gas valve, a control valve housing comprising a base having two cylindrical members upstanding therefrom, a pressure passage in the base leading into the central parts of both cylindrical members, a connecting passage in the base leading from the first cylindrical member to the second cylindrical member, an exhaust passage leading from the second cylindrical member, valve means in each cylindrical member, each valve means comprising a valve chamber, a pair of valve seats and a valve member movable in the chamber between the valve seats, the pressure passage being connected to one valve seat of each chamber, the connecting passage being connected from the other seat of the first valve means to the second valve chamber, the exhaust passage being connected to the other seat of the second valve means, and means yieldably biasing the second valve member to close off the exhaust passage.

4. In a gas valve, a diaphragm valve mechanism for controlling gas flow from an inlet to an outlet, a first and a second diaphragm chamber on opposite sides of the diaphragm, a control valve housing comprising a base having two cylindrical members upstanding therefrom, a pressure passage in the base leading into the central parts of both cylindrical members, a connecting passage in the base leading from the first cylindrical member to the second cylindrical member, an exhaust passage leading from the second cylindrical member, a control passage leading into the first cylindrical member, valve means in each cylindrical member, each valve means comprising a valve chamber, a pair of valve seats and a valve member movable in the chamber between the valve seats, the control passage being connected into the first diaphragm chamber, the pressure passage being connected to one valve seat of each chamber, the connecting passage being connected from the other seat of the first valve means to the second valve chamber, the exhaust passage being connected to the other seat of the second valve means, the pressure passage being connected with the inlet side of the diaphragm valve, the control passage being connected with one diaphragm chamber, means yieldably biasing the second valve member to close off the exhaust passage, and means yieldably biasing the first valve member to close off the connecting passage.

5. In a gas valve, a diaphragm valve mechanism for controlling gas flow from an inlet to an outlet, a first and a second diaphragm chamber on opposite sides of the diaphragm, a control valve housing comprising a base having two cylindrical members, a pressure passage leading into the central parts of both cylindrical members, a connecting passage leading from the first cylindrical member to the second cylindrical member, a control passage leading into the first cylindrical member, valve means in each cylindrical member, each valve means comprising a valve chamber, a pair of valve seats and a valve member movable in the chamber between the valve seats, the control passage being connected into the first diaphragm chamber, the pressure passage being connected to one valve seat of each chamber, the connecting passage being connected from the other seat of the first valve means to the second valve chamber, an exhaust passage connected to the other seat of the second valve means, the pressure passage being connected with the inlet side of the diaphragm valve, the control passage being connected with one diaphragm chamber, means yieldably biasing the second valve member to close off the exhaust passage, means yieldably biasing the first valve member to close off the connecting passage, means to shift the first valve in response to predetermined conditions, from closing the connecting passage to closing the pressure passage, whereby the one diaphragm chamber may change from pressure to exhaust and the diaphragm valve may open, and means to shift the second valve from closing its pressure passage to closing its exhaust passage, whereby the diaphragm valve may be reclosed.

6. In a gas valve, a diaphragm valve mechanism for controlling gas flow from an inlet to an outlet, a first and a second diaphragm chamber on opposite sides of the diaphragm, a control valve housing comprising a base having two cylindrical members, a pressure passage leading into the central parts of both cylindrical members, a connecting passage leading from the first cylindrical member to the second cylindrical member, a control passage leading into the first cylindrical member, valve means in each cylindrical member, each valve means comprising a valve chamber, a pair of valve seats and a valve member movable in the chamber between the valve seats, the control passage being connected into the first valve chamber, the pressure passage being connected to one valve seat of each chamber, the connecting passage being connected from the other seat of the first valve means to the second valve chamber, an exhaust passage connected to the other seat of the second valve means, the pressure passage being connected with the inlet side of the diaphragm valve, the control passage being connected with one diaphragm chamber, means to shift the first valve in response to predetermined conditions, from closing the connecting passage to closing the pressure passage, whereby the one diaphragm chamber may change from pressure to exhaust and the diaphragm valve may open, and means to shift the second valve from closing its pressure passage to closing its exhaust passage, whereby the diaphragm valve may be reclosed, said means to shift the first valve comprising a valve stem, a coil, a movable armature, an operating member responsive to the movement of the armature to actuate the valve stem, manual means to actuate the valve stem when the coil is inoperative including a first member movable from a released position to an actuating position adjacent the armature, a second member engageable with the operating member to move the same and actuate the valve stem, means connecting the first and second members so that when the first member is moved to its actuating position the second member will be moved to actuate the valve stem, and means releasably holding the manual means in actuated position whereby when the coil is energized the first member is returned to its released position and the second member is released.

7. In a gas valve, a main housing having an inlet and an outlet, a valve seat between the inlet and the outlet, a valve member cooperable with the valve seat, a diaphragm for operating the valve extending across the housing to provide a first diaphragm chamber, a cap-like member adapted to fit over the housing to provide a second diaphragm chamber, a valve housing member having first and second valve chambers therein, a valve in each valve chamber, a control passage from one diaphragm chamber to the first valve chamber, an exhaust passage and a pressure passage connected to the first valve chamber, the exhaust passage leading to the second valve chamber, the valve in the first valve chamber being movable to connect its control passage with either its exhaust passage or its pressure passage, yieldable means urging the valve in the first valve chamber to connect the control passage with the pressure passage, an exhaust passage and a pressure passage connected into the second valve chamber, said pressure passage being connected directly to the other diaphragm chamber, the valve in the second chamber being movable to connect the exhaust passage from the first valve chamber with either the exhaust passage or the pressure passage of the second valve chamber, and yieldable means urging the valve in the second valve chamber to connect the exhaust passage from the first valve chamber with the exhaust passage of the second valve chamber.

8. In a gas valve for use with a heater for conditioning the media within an enclosure, a main housing having an inlet and an outlet, a valve seat between the inlet and the outlet, a valve member cooperable with the valve seat, a diaphragm for operating the valve extending across the housing to provide a first diaphragm chamber, a cap-like member adapted to fit over the housing to provide a second diaphragm chamber, a valve housing member having first and second valve chambers therein, a valve in each valve chamber, a control passage from one diaphragm chamber to the first valve chamber, an exhaust passage and a pressure passage connected to the first valve chamber, the exhaust passage leading to the second valve chamber and the pressure passage leading directly to the other diaphragm chamber, the valve in the first valve chamber being movable to connect the control passage with either its exhaust passage or its pressure passage, means responsive to the temperature of the media within an enclosure for actuating the valve in the first valve chamber, an exhaust passage and a pressure passage connected into the second valve chamber, the valve in the second chamber being movable to connect the exhaust passage from the first valve chamber with either the exhaust passage or the pressure passage of the second valve chamber, and means responsive to the temperature in the heater for actuating the valve in the second valve chamber.

9. In a gas valve for use with a heater for conditioning the media within an enclosure, a main housing having an inlet and an outlet, a valve seat between the inlet and the outlet, a valve member cooperable with the valve seat, a diaphragm for operating the valve extending across the housing to provide a first diaphragm chamber, a cap-like member adapted to fit over the housing to provide a second diaphragm chamber, a valve housing member having first and second valve chambers therein, a valve in each valve chamber, a control passage from one diaphragm chamber to the first valve chamber, an exhaust passage and a pressure passage connected to the first valve chamber, the exhaust passage leading to the second valve chamber and the pressure passage leading directly to the other diaphragm chamber, the valve in the first valve chamber being movable to connect its control passage with either its exhaust passage or its pressure passage, yieldable means urging the valve in the first valve chamber to connect the control passage with the pressure passage, means responsive to the temperature of the media within an enclosure for actuating the valve in the first valve chamber, an exhaust passage and a pressure passage connected into the second valve chamber, the valve in the second chamber being movable to connect the exhaust passage from the first valve chamber with either the exhaust passage or the pressure passage of the second valve chamber, yieldable means urging the valve in the second valve chamber to connect the exhaust passage from the first valve chamber with the exhaust passage of the second valve chamber, and means responsive to the temperature in the heater for actuating the valve in the second valve chamber.

10. In a gas valve for use with a heater for conditioning the media within an enclosure, a main housing having an inlet and an outlet, a valve seat between the inlet and the outlet, a valve member cooperable with the valve seat, a diaphragm for operating the valve extending across the housing to provide a first diaphragm chamber, a cap-like member adapted to fit over the housing to provide a second diaphragm chamber, a valve housing member having first and second valve chambers therein, a valve in each valve chamber, a control passage from one diaphragm chamber to the first valve chamber, an exhaust passage and a pressure passage connected to the first valve chamber, the exhaust passage leading to the second valve chamber, the valve in the first valve chamber being movable to connect the control passage with either its exhaust passage or its pressure passage, means responsive to the temperature of the media within an enclosure for actuating the valve in the first valve chamber, an exhaust passage and a pressure passage connected into the second valve chamber, the valve in the second chamber being movable to connect the exhaust passage from the first valve chamber with either the exhaust passage or the pressure passage of the second valve chamber, and means responsive to the temperature in the heater for actuating the valve in the second valve chamber, said last named actuating means comprising a support, power means oppositely movable, abutment means moved by the power means, a first lever pivoted onto the support and engageable by the abutment means, a second lever pivoted on the support, the levers overlapping and extending in opposite directions from their pivots, a spring connecting the levers, it being connected to the second lever on one side of the pivot of the first lever, and connected to the first lever on the same side of its pivot, the first lever being movable to displace said last connection from one side to the other of the pivot of the second lever, whereby the first lever is always urged in one direction by the spring, and the other lever is moved with a snap action upon movement of the first lever, and an adjustable connection between the second lever and the valve stem to provide a differential between the position of the power means for shifting the valve in one direction and the position for shifting it in the other.

CLAUDE M. GARNER.

REFERENCES CITED

The following references are of record in the file of this patent:

UNITED STATES PATENTS

| Number | Name | Date |
|---|---|---|
| 937,678 | Glauber | Oct. 19, 1909 |
| 961,821 | Walker | June 21, 1910 |
| 1,722,920 | Hynes | July 30, 1929 |
| 2,031,932 | Cornell | Feb. 25, 1936 |
| 2,051,294 | Gauger | Aug. 18, 1936 |
| 2,051,295 | Gauger | Aug. 18, 1936 |
| 2,112,397 | Gauger | Mar. 29, 1938 |
| 2,123,814 | Summers | July 12, 1938 |
| 2,138,503 | O'Brien | Nov. 29, 1938 |
| 2,161,248 | Denison | June 6, 1939 |
| 2,218,861 | Stumpf | Oct. 22, 1940 |
| 2,220,479 | DeBell | Nov. 5, 1940 |
| 2,222,141 | Denison | Nov. 19, 1940 |
| 2,232,502 | Wittmann | Feb. 18, 1941 |
| 2,244,555 | Harris | June 3, 1941 |
| 2,317,639 | Ray | Apr. 27, 1943 |
| 2,377,517 | Ray | June 5, 1945 |
| 2,381,799 | Berkholder | Aug. 7, 1945 |
| 2,387,164 | McCarty | Oct. 16, 1945 |
| 2,407,761 | McPherson | Sept. 17, 1946 |